XR 3,648,278

TX1030N

United States Patent

Miller

[15] 3,648,278

[45] Mar. 7, 1972

[54] METHODS AND APPARATUS FOR USE IN PROCESSING WELL LOGGING DATA

[72] Inventor: Gerald K. Miller, Ridgefield, Conn.

[73] Assignee: Schlumberger Technology Corporation, New York, N.Y.

[22] Filed: Dec. 30, 1968

[21] Appl. No.: 787,683

Related U.S. Application Data

[62] Division of Ser. No. 703,428, Feb. 6, 1968, Pat. No. 3,457,544.

[52] U.S. Cl. ....................................340/347 AD, 324/10
[51] Int. Cl. ....................................H03k 13/16
[58] Field of Search ....................340/347, 18; 324/6, 9, 10

[56] References Cited

UNITED STATES PATENTS 2,824,285 2/1958 Hunt ..............................340/347 X
3,405,349 10/1968 Moran ..............................324/6

*Primary Examiner*—Maynard R. Wilbur
*Assistant Examiner*—Charles D. Miller
*Attorney*—Donald H. Fidler, Edward M. Roney, William R. Sherman, Stewart F. Moore, Jerry M. Presson and Leonard R. Fellen

[57] ABSTRACT

In accordance with an illustrative embodiment of the invention, a variable duty cycle analog-to-digital converter for use with well logging magnetic tape recording apparatus is disclosed. For those well logging signals which require a high degree of amplitude resolution, a long duty cycle is used. On the other hand, for those well logging signals which require a high degree of depth resolution, as, for example, dipmeter signals, a short duty cycle is used to allow the tape recorder to utilize a fast sampling rate.

11 Claims, 23 Drawing Figures

Gerald K. Miller
INVENTOR.

BY Edward M. Roney
ATTORNEY

Gerald K. Miller
INVENTOR

BY Edward M. Roney
ATTORNEY

Gerald K. Miller
INVENTOR.

BY Edward M. Roney
ATTORNEY

Patented March 7, 1972 3,648,278

4 Sheets-Sheet 4

Gerald K. Miller
INVENTOR.

BY Edward M. Roney
ATTORNEY

METHODS AND APPARATUS FOR USE IN PROCESSING WELL LOGGING DATA

This application is a division of application Ser. No. 703,428 filed by Gerald K. Miller et al. on Feb. 6, 1968 now U.S. Pat No. 3,457,544. This invention relates to methods and apparatus for use in recording well logging data on magnetic recording tape and more particularly to the analog-to-digital conversion of such well logging data for subsequent recording on magnetic tape.

In the logging of wells, there are a variety of different measurements derived from different tools which a general purpose tape recorder should be able to handle. For example, a general purpose tape recorder may be called upon to record measurements derived from so-called "regular" type of well tools such as those which produce measurements of the resistivity, acoustic travel time, density, natural radioactivity, etc., of a formation. Many times, a plurality of exploring devices for making these measurements may be mounted on one support member so as to derive a plurality of such measurements during one trip in a borehole.

In addition to these "regular" logs, so-called "dipmeter" surveys of the dip of formations surrounding a borehole are often times run. In present day practice, the dipmeter tools for making these surveys take the form of a plurality of resistivity-type exploring devices mounted on wall-engaging pad members which operate to derive measurements of the formation resistivity at various circumferentially spaced locations around the borehole wall. The measurements from each of the pad mounted exploring devices can then be correlated, as by a digital computer, to produce an indication of the formation dip relative to the orientation of the well tool. Moreover, it is usually necessary to produce a measurement of the borehole diameter for use in this correlation. To reference this dip indication to true vertical (i.e., the gravitational axis) and an azimuthal reference direction, measurements of the azimuth, inclination and relative bearing of the tool must usually be made.

Since for the accurate determination of dip, the formation resistivity at small depth increments must be known, it is important that these resistivity measurements be frequently sampled and digitized, usually at a sampling rate far in excess of that necessary for regular logs. This, coupled with the large number of measurements made by dipmeter tools, requires a fast sampling rate. On the other hand, the amplitude resolution necessary for regular logs is usually greater than that for dipmeter logs. Thus, a truly general purpose well logging tape recorder must satisfy these two different considerations, i.e., resolution in the depth domain for dipmeter logs and in the amplitude domain for regular logs. Copending application Ser. No. 787,721 filed by John P. Warren on Dec. 30, 1968 (now U.S. Pat. No. 3,494,187, issued Feb. 10, 1970, describes circuitry for selectively varying the sampling rate. However, the analog-to-digital converter portion of the tape recorder should also be able to satisfy both of these requirements, i.e., greater amplitude resolution when processing regular logs and greater depth resolution when recording dipmeter logs.

It is an object of the invention to provide new and improved methods and apparatus for use in digitizing well logging signals.

Another object is to provide such a digitizer that is easily adapted to process all types of well logging signals, including those derived from so-called dipmeter tools.

In accordance with the present invention, methods and apparatus for digitizing well logging signals comprises receiving well logging signals which were derived from a well tool and repetitively generating a ramp voltage which extends over a fixed time interval. Then, the amplitude of each received well logging signal is compared with the ramp voltage and a pulse width modulated signal representative of the well logging signal amplitude is produced. The pulse width modulated signal is then utilized to produce a digital data word which is numerically representative of the well logging signal amplitude. To facilitate the processing of regular logging signals, as well as dipmeter signals, the duty cycle of the digitizing apparatus can be changed by returning the ramp voltage to a selected reset voltage in response to the ramp voltage attaining a predetermined amplitude. By so doing, the ramp voltage will return or reset to an initial starting voltage in readiness for digitizing the next well logging signal at a selected time such that the digitizing duty cycle will be changed. Moreover, the initial starting voltage can be changed to produce further changes in the duty cycle.

For a better understanding of the present invention, together with other and further objects thereof, reference is had to the following description taken in connection with the accompanying drawings, the scope of the invention being pointed out in the appended claims.

Referring to the drawings.

Figure 1:
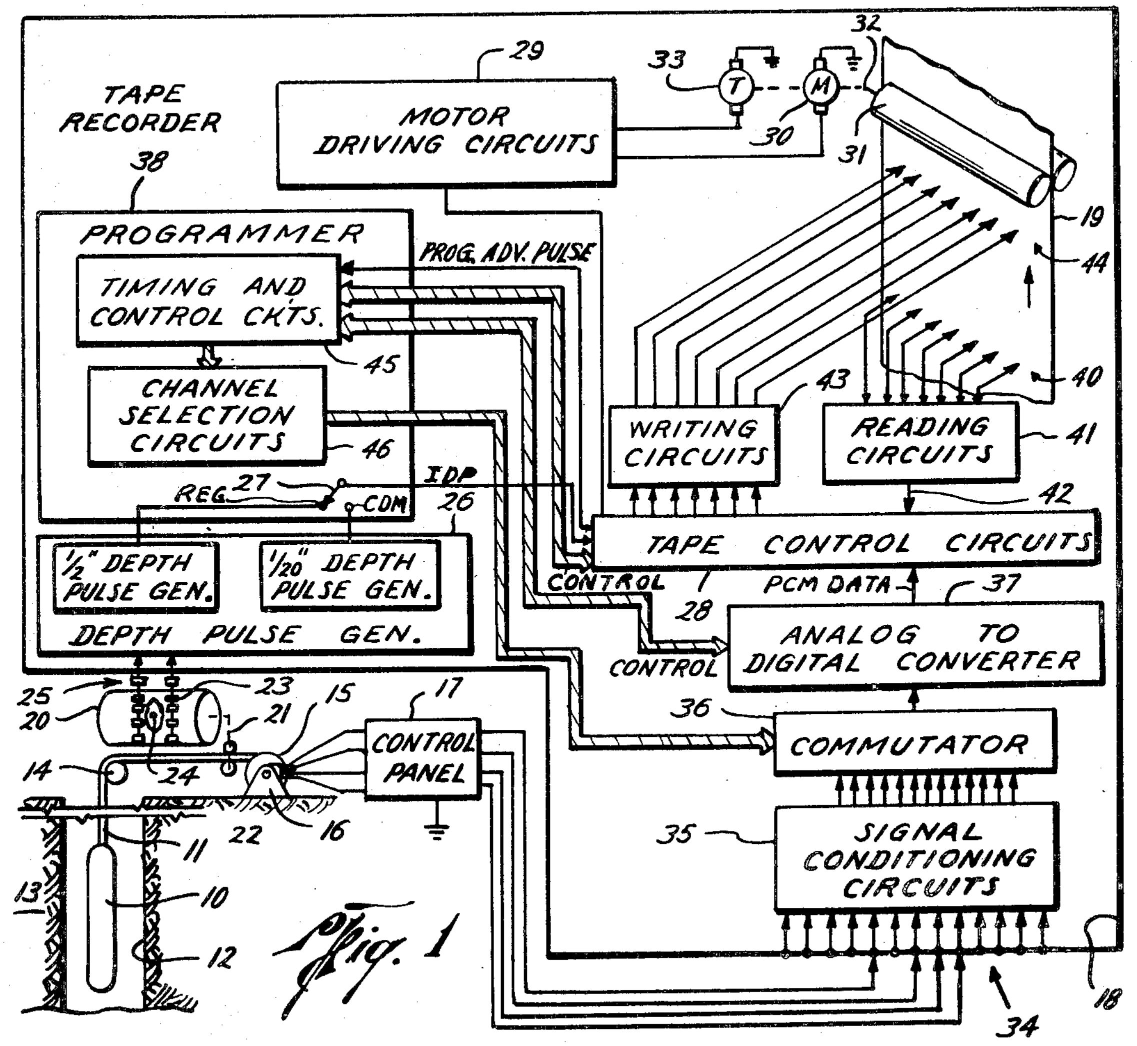
FIG. 1 shows in a schematic manner a borehole investigating system along with a schematic representation of a magnetic tape recording system in which the digitizer of the present invention can find use.
Figure 3:
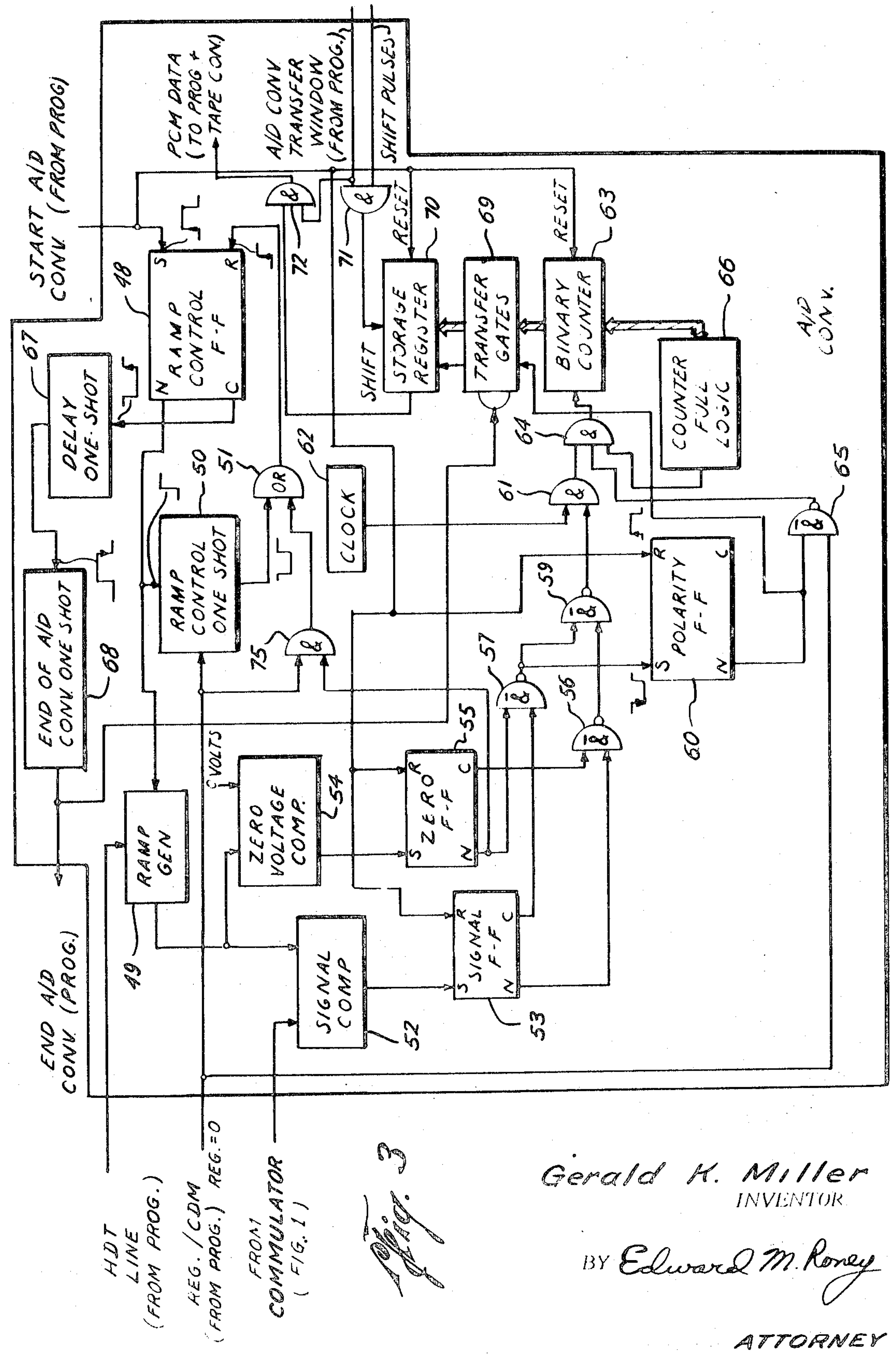

FIG. 3 schematically shows an analog-to-digital converter for use with the tape recording apparatus of FIG. 1 in accordance with the present invention;

FIGS. 4A–4K show timing waveform diagrams useful in understanding the operation of the analog-to-digital converter of FIG. 2 when operating to digitize regular well logs; and FIGS. 5A–5G show wave form timing diagrams useful in understanding the operation of the analog-to-digital converter of FIG. 2 when processing dipmeter logs.

Referring to FIG. 1, there is shown a downhole investigating means 10 which is supported on the end of an armored cable 11 in a borehole 12 for investigating subsurface earth formations 13. The downhole exploring means 10 may include one or more investigating devices for investigating different characteristics of the subsurface earth formations. These devices may include various electrode arrays and coil arrays for measuring the electrical resistivities or conductivities of the subsurface formations, various radioactivity devices for measuring different nuclear phenomena in a borehole, various acoustic measuring devices, or any combination of these or other borehole measuring devices.

At the surface of the earth, the cable 11 passes over a sheave wheel 14 and is secured to a drum and winch mechanism 15. The drum and winch mechanism 15 includes a suitable brush and slip ring arrangement 16 for providing electrical connections between the cable conductors and a control panel 17. The control panel 17 suitably includes a power supply for supplying power to the downhole exploring means and suitable electronic circuitry for receiving indications of the parameters measured by the various downhole investigating devices and preparing these well logging signals for application to other circuits.

The surface apparatus also includes a tape recorder 18 for recording the well logging signals derived from the downhole exploring means 10 in digital form on a magnetic tape 19. To control the operation of the tape recorder 18 as a function of borehole depth, a slotted drum 20 is driven by a rotating shaft 21 from a lower driving wheel 22. A plurality of optical slots 23 are cut in the outer periphery of the slotted drum 20 so that light from a central light source 24 can pass through the slots 23 to a pair of photocells 25 so as to provide electrical signals at given increments of depth to a depth pulse generating circuit 26. The slots in the slotted drum 20 make up two separate tracks, the slots in each track being 1 inch of cable travel apart and staggered from one track to the next so that there will be a slot in one or the other track each one-half inch of cable travel.

The depth pulse generating circuit 26 includes two related circuits for generating depth pulses at depth intervals of either one-half inch or one-twentieth inch depending on the type of well logging signal to be recorded. More specifically, when recording the regular type of logging signal, such as induction logging, sonic logging, etc., the ½-inch depth pulses are selected via a switch 27. The 1/20-inch depth pulses are selected when recording dipmeter signals derived from one type of dipmeter tool known as the "continuous dipmeter tool" (CDM), because the resolution of the dipmeter signals in the depth domain must be very high in order to accurately determine the dip of the formations adjoining the borehole. Thus, more frequent data sampling is necessary in this specialized case.

The selected depth pulse, designated incremental depth pulse (IDP), is supplied to tape control circuits 28 to initiate the recording operation. This incremental depth pulse causes a signal to be applied from the tape control circuits 28 to a motor driving circuit 29 for energizing a motor 30 which moves the recording tape via a tape capstan driven by a shaft 32. The shaft 32 also drives a tachometer 33 which supplies an electrical signal proportional to the speed of rotation of the shaft 32, and thus the tape velocity, to the motor driving circuit 29 for feedback control purposes.

Concerning the data processing features of the tape recorder 18, the analog well logging signals from the control panel 17 are applied to selected input terminals 34 of the tape recorder 18 for application to a plurality of signal conditioning circuits 35 which function to convert the well logging signals to a form suitable for processing by the tape recorder 18. Each input terminal represents a different channel of the tape recorder. As many channels up to the maximum available may be used at one time as is desired. The parallel analog output signals from signal conditioning circuits 35 are sequentially sampled by a commutator 36 for application to an analog-to-digital converter 37. More specifically, a programmer 38 sends a channel designation to the commutator 36 for connecting selected ones of the input terminals 34 to the analog-to-digital converter 37. Each sampled well logging signal is then digitized by the analog-to-digital converter 37. Upon completion of digitizing each sampled signal, the A/D converter 37 signals the programmer 38 of this event which then causes the newly digitized data word to be serially shifted to the tape control circuits for recording on the magnetic tape 19.

To control the recording of data on the magnetic tape 19, as well as various other functions within the tape recorder 18, magnetic marks already recorded on the magnetic tape 19 are utilized. To facilitate operation, the first time data is recorded on any given tape, magnetic marks are desirably prerecorded thereon. These prerecorded magnetic marks need only be recorded in one track of the tape 19. A plurality of reading heads 40 are located in suitable relationship to the tape 19 so as to detect the magnetic flux therein. These reading heads 40 are connected to a plurality of reading circuits 41 which supply a "detected mark" indication to the tape control circuits 28 via a conductor 42. These "detected mark" pulses are ultimately used to generate inscribing pulses for converting the data word to the tape format and writing the data on the magnetic tape 19 via a plurality of writing circuits 43 and writing heads 44.

Selected ones of the "detected mark" pulses are utilized to generate "program advance pulses" for application to the timing and control circuits 45 of the programmer 38. These "program advance pulses" are generated as each data word is written on tape and are utilized to advance a sequence or word counter in the timing control circuits 45 to activate the A/D converter 37. This sequence counter causes channel selection circuits 46 to instruct the commutator 36 to select the proper analog signal for application to the analog-to-digital converter 37. The timing and control circuits 45 also control the transfer of data from the A/D converter 37 to the other circuits in response to an "end A/D conversion pulse" from the A/D converter 37.

Figures 2A, 2B, 2C:
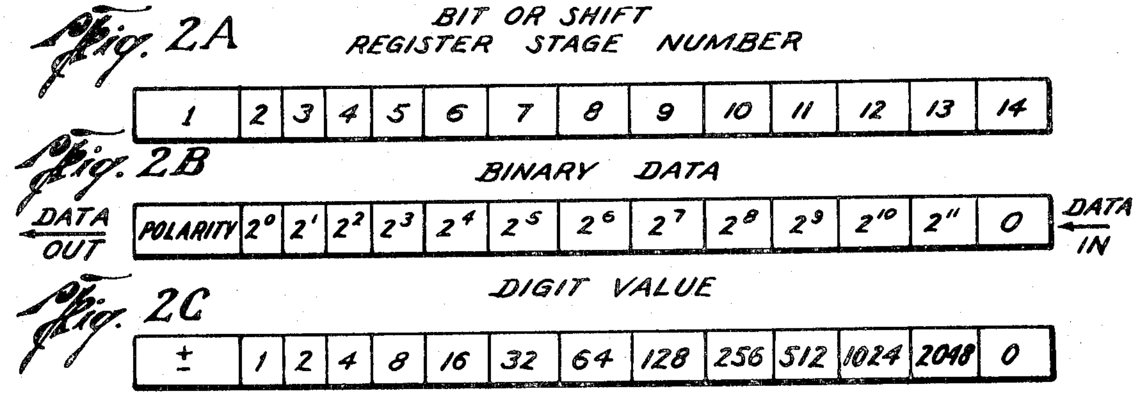
FIGS. 2A–2C illustrate the serial word format utilized with the FIG. 1 tape recording apparatus.

Now referring to FIGS. 2A–2C, there is shown the shift register word format utilized in the tape recording apparatus of FIG. 1. FIG. 2A shows the shift register stage number and FIG. 2B shows the word format with the data being shifted from right to left. It can be seen from FIG. 2B that stage number 1 contains the polarity bit of the data word and stage numbers 2–13 represent the weighted binary data bits with stage number 2 corresponding to the least significant bit position and stage number 13 corresponding to the most significant bit. Stage number 14 is an extra overflow stage. FIG. 2C shows the weighted bit values for each of the shift register stages.

Before discussing the details of the analog-to-digital converter circuit of the present invention, it would first be desirable to discuss some general considerations. The tape recording apparatus of FIG. 1 has three different modes of operation. These are the regular logging mode, designated REG, for recording the regular type of well logging signals (e.g., induction log, sonic log, neutron log, etc.), the CDM mode of operation for recording well logging signals derived from the so-called "continuous dipmeter tool," and the HDT mode for recording well logging signals derived from the so-called "high resolution dipmeter tool." The various features of the so-called "CDM" tool can be found in U.S. Pat. No. 2,746,162 granted to M. F. B. Picard on May 22, 1956, and U.S. Pat No. 2,427,950 granted to H. G. Doll on Sept. 23, 1947. The features of the so-called "HDT" tool can be found in copending application Ser. No. 219,619 by A. M. Vezin filed on Aug. 27, 1962 now U.S. Pat. No. 3,423,671. The requirements for the three modes are substantially different. These differences will be discussed at a latter point.

The REG and CDM modes both use one programmer, shown in FIG. 1, and the HDT mode uses a separate programmer (not shown). A switch (not shown) in the programmer 38 places a logical "1" on a control line, designated REG/CDM, in the CDM mode and a "0" in the REG mode so as to signal the other tape recorder circuits of the mode of operation. The discussion from this point until the HDT mode of operation is discussed will concern the REG and CDM modes of operation. For further details concerning the various circuits of the FIG. 1 tape recorder refer to copending application Ser. No. 703,428 filed by Gerald K. Miller et al., on Feb. 6, 1968 now U.S. Pat. No. 3,457,544.

Now referring to FIG. 3, there is shown the analog-to-digital converter 37 of the present invention in more detail. First, the operation of the A/D converter 37 in the REG mode will be discussed. A "start A/D conversion pulse" is obtained from the programmer 38 to set a "ramp control flip-flop" 48 on the leading edge thereof. (In the various Figures in this application, an arrow on either the leading or lagging edge of a pulse will indicate whether the leading or lagging edge triggers the particular circuit. If no arrow or pulse is shown, then the circuit is DC coupled.) The normal output of the "ramp control flip-flop" 48 goes to "1" upon being set to enable a ramp generator 49 to begin generating a negative going ramp voltage. The positive going or leading edge of this normal output from the "ramp control flip-flop" 48 also triggers a "ramp control one-shot" 50 whose output is normally "1" or positive, but which goes to "0" during the unstable period of operation of the one-shot. The "ramp control one-shot" 50 controls the maximum time for digitizing by resetting the "ramp control flip-flop" 48 via an OR-gate 51 on the rising or lagging edge of the ramp control pulse from one-shot 50.

During the time that the "ramp control one-shot" 50 is at the "0" level, the voltage of the analog well logging signal from commutator 36 of FIG. 1 is compared with the ramp voltage generated from ramp generator 49 by a signal comparator 52. When the signal amplitude exceeds the ramp voltage, a signal is generated from signal comparator 52 to set a flip-flop 53, designated "signal flip-flop." This ramp voltage is also compared with zero volts in a "zero voltage comparator" 54 and when the ramp voltage becomes less than zero volts, a signal is generated from "zero voltage comparator" 54 which sets a flip-flop 55, designated "zero flip-flop."

The normal output of "signal flip-flop" 53 and the complementary output of "zero flip-flop" 55 are supplied to the inputs of a NAND-gate 56. Likewise, the normal output of the "zero flip-flop" 55 and the complementary output of the "- signal flip-flop" 53 are supplied to the inputs of a NAND-gate 57. The outputs of NAND-gates 56 and 57 are supplied to the inputs of a NAND-gate 58. This combination of gates from the outputs of flip-flops 53 and 55 to the output of NAND-gate 58 comprises an "Exclusive OR" arrangement wherein the output of NAND-gate 59 will be a logical "1" if one but not both of the flip-flops 53 and 55 are set. The time that it takes the ramp voltage to pass between the signal amplitude and zero volts is proportional to the signal amplitude, and thus the pulse width of the output pulse from NAND-gate 59 is a pulse width modulated signal proportional to the signal amplitude.

To determine the polarity of the well logging signal being digitized, it is merely necessary to determine if the signal amplitude is greater or less than zero volts. If it is less than zero volts (i.e., negative), then the normal output of "zero flip-flop" 55 and the complementary output of "signal flip-flop" 53 will both be at a logical "1" level, thus causing the output of NAND-gate 57 to go to a logical "0." The negative going edge of this drop to "0" sets a flip-flop 60, designated "polarity flip-flop." Of course, if a positive well logging signal is being digitized, thus causing the "signal flip-flop" 53 to set first, then the output of NAND-gate 57 cannot go to "0" and the "-polarity flip-flop" 60 will remain in the reset state.

The pulse width modulation (PWM) signal from NAND-gate 59 enables an AND-gate 61 to pass a plurality of high frequency clock pulses from a clock source 62, e.g., an oscillator, to a binary counter 63 via another AND-gate 64. Since the number of pulses applied to binary counter 63 is proportional to the time interval of the pulse width modulation signal, the number of pulses counted by counter 63 during this time interval is proportional to the amplitude of the analog well logging signal.

Concerning the other inputs to AND-gate 64, one input is derived from the output of a NAND-gate 65 to which is supplied the normal output of the "polarity flip-flop" 60 and the conductor from the programmer designated "REG/CDM." In the REG mode ("0"), the output of NAND gate 65 is always "1."The other input to AND-gate 64 is derived from a "-counter-full logic circuit" which is always at the "1" level until the counter 63 reached full capacity (i.e., all "1's"), at which time it goes to "0" to disable AND-gate 64. This prevents the untimely resetting of counter 63. This "counter-full logic circuit" 66 could comprise, for example, a NAND gate connected to the normal output of each flip-flop of the binary counter 63.

Now, at sometime after the PWM signal goes to "0," the "ramp control one-shot" 50 turns off, i.e., goes from "0" to "1."The "on-time" of one-shot 50 is desirably set slightly greater than two times the maximum expected pulse width of the PWM signal. The rising edge of this pulse from one-shot 50 resets the "ramp control flip-flop" 48, thus disabling the ramp generator 49. The rising or lagging edge of the complementary output of the "ramp control flip-flop" 48 energizes a delay one-shot 67. The lagging or falling edge of the positive pulse output from delay one-shot 67 triggers an "end of A/D conversion one-shot" 68 which sends a signal to the programmer designated "end A/D conversion" and also energizes a plurality of parallel transfer gates 69 which causes a parallel transfer of the data in the binary counter 63 to a storage resister 70. The normal output of the "polarity flip-flop" 60 is likewise transferred via the transfer gates 69 to the proper stage of storage register 70. As mentioned previously, a logical "1" indicates negative polarity and a logical "0" indicates positive polarity. The "end A/D conversion pulse" supplied to the programmer ultimately causes a transfer window and a burst of clock pulses to be supplied from the programmer. This programmer circuitry is shown and described in the above-mentioned copending Miller et al. patent application. The transfer window enables a pair of AND-gates 71 and 72 and allows the newly digitized data to be shifted out of the storage register 70 to the programmer 38 for application to other portions of the tape recording system. To reset the A/D converter for the next digitizing operation, the rising or leading edge of the "start A/D conversion pulse" from the programmer 38 resets the flip-flops 53 and 55, binary counter 63, and storage register 70 in readiness for the next digitizing operation.

Figure 4:
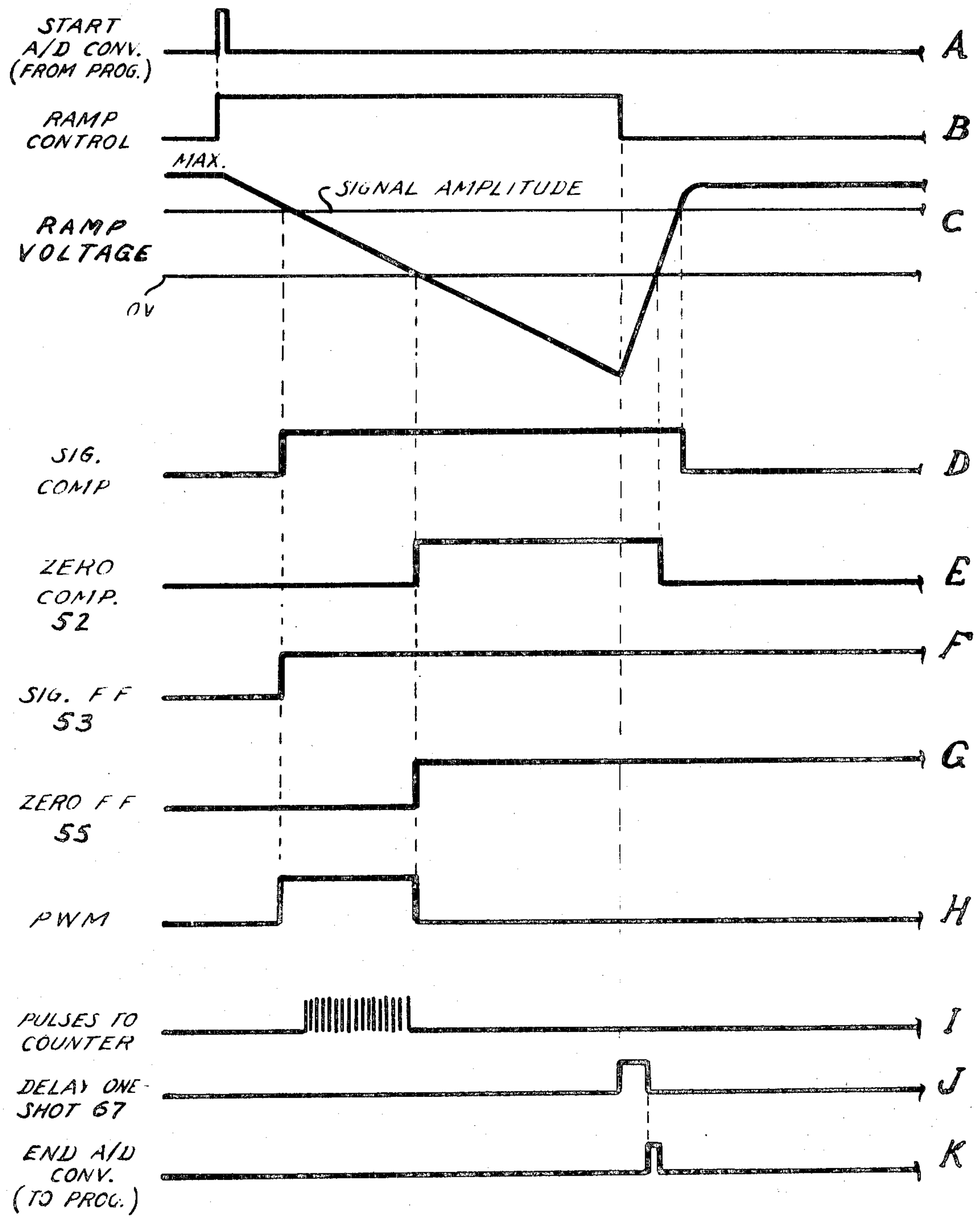

To summarize the operation of this A/D converter when operating in the REG mode, refer to the timing diagram of FIGS. 4A–4K in conjunction with FIG. 3. The "start A/D conversion pulse" which resets the various components of the A/D converter and sets the "ramp control flip-flop" 48 is shown in FIG. 4A, with the resulting rise to "1" of the normal output of the "ramp control flip-flop" 48 illustrated in FIG. 4B. The resulting ramp voltage generated from the ramp generator 49 is shown in FIG. 4C. When the ramp voltage is equal to or less than the signal amplitude, the output of the signal comparator 52 goes to "1" as shown in FIG. 4D and when the ramp voltage is less than zero volts, the output of the zero comparator 54 goes to "1" as shown in FIG. 4E. The corresponding setting of the "signal and zero flip-flops" 53 and 55 are illustrated in FIGS. 4F and 4G respectively. As shown in FIG. 4H, the pulse width modulation signal output of NAND-gate 59 is at the "1" level during the time that the ramp voltage is between the signal amplitude level and zero volts thus causing the binary counter 63 to count the clock pulses of FIG. 4I. As seen by comparing FIGS. 4B, 4C, 4J and 4K, the resetting of the "ramp control flip-flop" 48 by the "ramp control one-shot" 50 causes the ramp control voltage to charge or increase rapidly to its initial level and also causes the generation of the "end A/D conversion pulse" of FIG. 4K after the delay of FIG. 4J by the delay one-shot 67.

As mentioned earlier, the tape recording apparatus of the present invention has the capability of operating in a plurality of modes so as to digitize and record widely varying types of well logging information. The requirements for recording the dipmeter type of logging information are substantially different from the requirements for the regular logging type of signals since the resolution in the depth domain required for the dipmeter is substantially greater than for regular logging, thus requiring more frequent sampling of the well logging signals. The analog-to-digital converter of the present invention is adapted to provide different duty cycles or digitizing time periods depending on whether the mode of operation is REG or CDM. To this end, remembering that the REG/CDM control line is "1" in the CDM mode, the "ramp control one-shot" 50 is disabled and an AND-gate 75 is enabled. The other input to AND-gate 75 is derived from the normal output of the "zero flip-flop" 55. By this means, the digitizing time period is no longer controlled by the "ramp control one-shot" 50, but is instead controlled by the time for the ramp voltage to decrease or discharge to zero volts. This is possible because dipmeter signals are never suppose to be negative. This, then reduces the duty cycle of the A/D converter by a considerable amount thus allowing for more frequent sampling of information.

Additionally, again, since dipmeter signals are never suppose to be negative, the REG/CDM line being at "1" in the CDM mode enables the NAND-gate 65 which allows the AND-gate 64 to be disabled when the "polarity flip-flop" 60 indicates that a negative signal is being processed. In the event of such a negative signal in the CDM mode, clock pulses will not be passed to binary counter 63, thus leaving the counter empty. However, the polarity bit from "polarity flip-flop" 60 is gated by transfer gates 69 to the storage register 70 to indicate that a negative number was processed.

Figure 5:
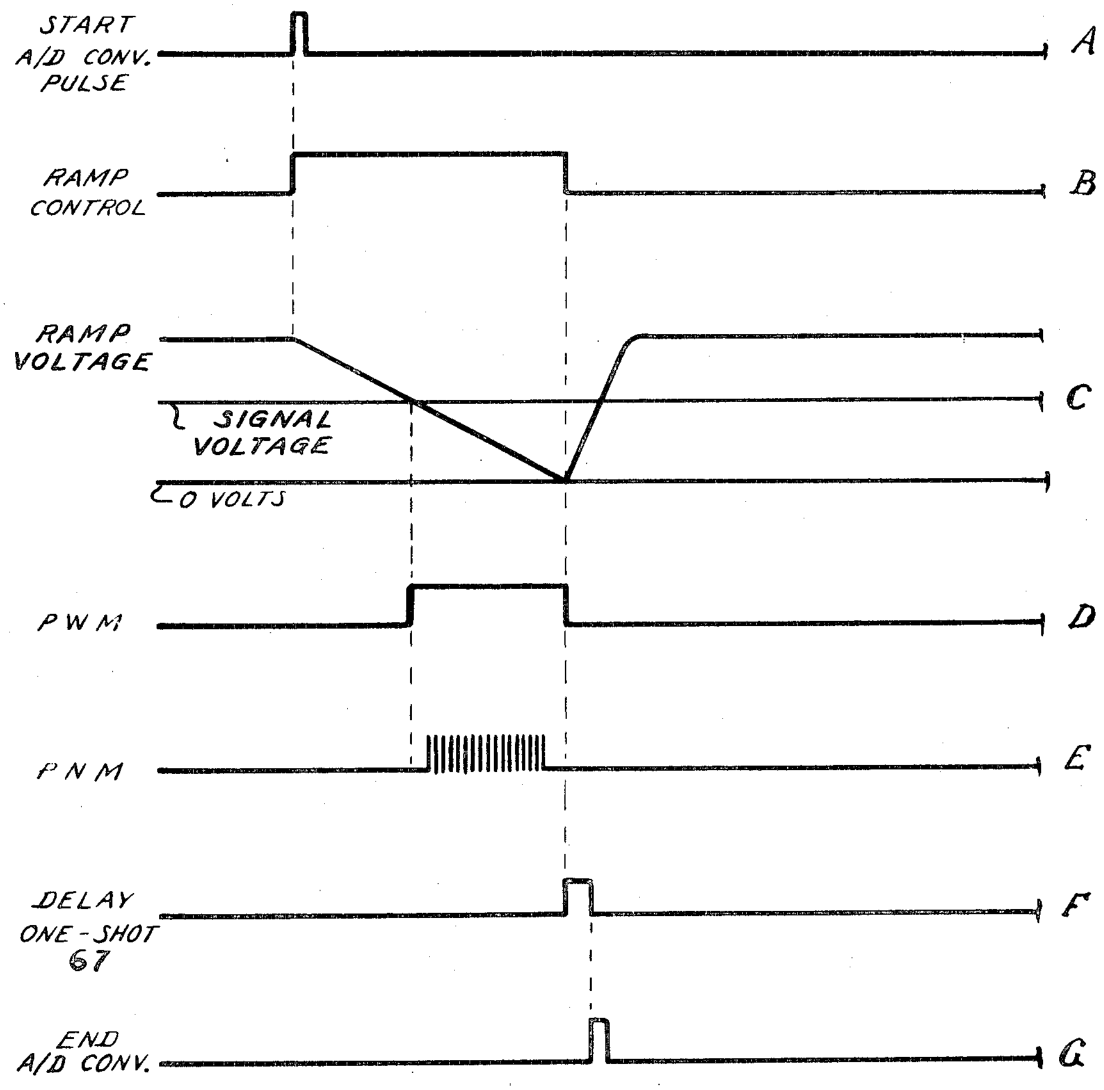

Referring to FIG. 5, there is shown the timing diagram of the operation of the A/D converter 37 in the CDM mode. Again, the "start A/D conversion pulse" of FIG. 5A produces the ramp control signal of FIG. 5B from "ramp control flip-flop" 48 to be applied to the ramp generator 49. This in turn causes the ramp voltage of FIG. 5C to be generated. As in the regular mode, the time interval during which the ramp voltage is between the signal amplitude and zero volts determines the width of the pulse width modulation signal shown in FIG. 5D. This PWM signal in turn causes the pulses of FIG. 5E to be counted by binary counter 63. However, in this CDM mode, the ramp control signal of FIG. 5B goes to "0" upon the ramp voltage equaling zero volts. As in the REG mode, the turning off of the ramp control signal causes the "end A/D conversion pulse" of FIG. 5G to be generated after the delay produced by the delay pulse of FIG. 5F for instructing the programmer 38 that the A/D conversion process is ended and to transfer the data contained in binary counter 63 to the storage register 70. By stopping the A/D conversion process when the ramp voltage reaches zero volts, the A/D conversion process in the CDM mode takes approximately one-half as much time as in the REG mode.

The discussion up to this point has been concerned with the tape recorder being in the regular or CDM modes of operation. It would also be desirable to record, with the same tape recording apparatus that records regular and CDM logging signals, those logging signals obtained from the "high resolution dipmeter tool." However, there are some problems when attempting to record high resolution dipmeter (HDT) signals with this same tape recording apparatus. This is due primarily to the large number of well logging signals generated by the "-high resolution dipmeter tool." More specifically, there are five dip signals which require a large degree of resolution in the depth domain, and eight signals which do not require such a high degree of resolution.

As set forth in the copending Miller et al., application, to insure that the data from each signal channel is recorded at equal depth intervals on the magnetic tape, i.e., each signal channel is sampled at a constant depth rate, a format utilizing a block of eight frames of 12 words each is utilized for recording HDT signals. Two words of each frame are set aside for depth and one of the eight slow signals. The remaining 10 words of each frame are set aside for the five fast signals. While this block format provides for evenly spaced sampling intervals, the problem still remains of sampling often enough to provide good resolution for the dip signals, i.e., the fast signals, to provide a desired degree of resolution while moving the downhole exploring means 10 (FIG. 1) at a reasonable rate. To improve sampling and recording speed, each word in the HDT mode comprises two characters instead of three. This is possible since, in the HDT mode, amplitude resolution is not as important as depth resolution.

It has been found that if each fast signal channel is sampled at depth intervals of one-fifth inch apart, the required degree of depth resolution can be obtained. Since each fast signal is sampled twice per frame, six input signal channels must be sampled within a depth interval of one-fifth inch. To accomplish this, the 1/20-inch incremental depth pulses are divided down to 1/10-inch incremental depth pulses and the tape recording apparatus steps through three-two character words before stopping. As set forth in the copending Miller application, the tape recording apparatus writes the data in this format requiring only a change in the programmer circuits. In the HDT programmer (not shown), the REG/CDM line is operated at the "1" level and an HDT line (shown in FIG. 3) is energized.

Since in this HDT mode, the sampling of data is at a faster rate than in either the regular or CDM modes of operation, the A/D converter should desirably have a shorter duty cycle. Referring to the A/D converter 37 of FIG. 3, the HDT control line is supplied to the ramp generator 49 for changing the operating characteristics thereof. More specifically this HDT line, which during the HDT mode is at the "1" level, causes the starting point of the generated ramp of FIG. 4C to be a lower voltage level. This can be accomplished within the ramp generator 49 by a suitable relay which connects a different voltage source to the ramp generating circuits. Alternatively, one of a pair of Zener diodes could be switched into the circuits to supply this new reference or starting voltage. Since the REG/CDM line is set at the "1" level for HDT operation, the A/D converter will reset at zero volts as in the CDM mode of operation. Thus, the A/D conversion process in the HDT mode will take place in a substantially shorter interval of time than in the regular and CDM modes.

It can be appreciated that the analog-to-digital converter of the present invention allows for the digitizing and subsequent recording of well logging signals derived from virtually every known type of well tool. This has been accomplished by providing a variable duty cycle analog-to-digital converter, the duty cycle being controlled in response to control signals supplied from a central programmer. This variation in duty cycle has been accomplished by swapping amplitude resolution for depth resolution or speed in the case of dipmeter signals, and by swapping depth resolution for amplitude resolution in the case of regular well logging signals.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for digitizing well logging signals of at least two different types, a first requiring relatively high resolution in a first domain and a second requiring relatively high resolution in a second domain, the signals of said second type always being of a known polarity and the signals of both types being derived from a well tool moved through a borehole, comprising:

- input means for receiving the well logging signals of both types;
- means adapted for generating a ramp voltage;
- means responsive to given incremental movements of the well tool for generating a fixed time duration control signal and applying said control signal to said ramp generating means to thereby cause the generation of a ramp voltage over a fixed time interval, said ramp voltage having at different times opposite polarities in the case of reception of signals of said first type and having a single polarity in the case of reception of signals of said second type;
- means for comparing the amplitude of each received well logging signal with the ramp voltage and generating a pulse width modulated signal representative of the well logging signal amplitude;
- means responsive to the pulse width modulated signal for producing a digital data word which is numerically representative of the well logging signal amplitude; and
- means for changing the duty cycle of said digitizing apparatus including means responsive to the ramp voltage attaining a predetermined amplitude for overriding said control signal and resetting said ramp generating means in readiness for another well logging signal.

2. The apparatus of claim 1 wherein the means for generating a pulse width modulated signal includes means for comparing the ramp voltage with said well logging signal and producing a first output signal upon the ramp voltage becoming substantially equal to the signal amplitude, means for comparing the ramp voltage with zero volts and producing a second output signal whenever the ramp voltage has a selected polarity relative to zero volts, means responsive to said first and second output signals for producing the pulse width modulated signal; and further including means responsive to the order of occurrence of said first and second output signals for producing a binary signal representative of the polarity of each well logging signal.

3. The apparatus of claim 2 wherein the duty cycle changing means includes means responsive to said second output signal for overriding said control signal and resetting said ramp generating means, and means responsive to said binary polarity signal for disabling said digital data word producing means whenever said binary polarity signal indicates a negative well logging signal.

4. The apparatus of claim 1 wherein said digital data word producing means includes a pulse source operating at a given frequency, counting means adapted to count the pulses generated from said pulse source, gate means responsive to said pulse width modulated signal for passing said generated pulses to said counting means so that said counting means will accumulate a digital count which is numerically representative of the amplitude of said well logging signal, means responsive to the resetting of said ramp generating means for causing the contents of said counting means to be transferred out of said counting means for subsequent recording or computation.

5. The apparatus of claim 1 wherein said duty cycle changing means further includes means for changing the initial starting voltage of said ramp voltage so that the time for said ramp voltage to change from said initial starting voltage to said predetermined amplitude will be different thus changing said duty cycle.

6. In apparatus for processing well logging signals derived from any one of a plurality of well tools moved through a borehole wherein at least one of said plurality of tools produces signals of a first type and at least one other of said plurality of tools produces signals of a second type, the signals of said first type being sometimes positive and sometimes negative and the signals of said second type being always positive and wherein a mode control signal corresponding to the type of well tool is generated, general purpose apparatus for digitizing the well logging signals, comprising:

- input means for receiving the well logging signals of both types and the mode control signal;
- means adapted for generating a ramp voltage;
- means responsive to given incremental movements of the well tool for generating a fixed time duration ramp control signal and applying said ramp control signal to said ramp generating means, said ramp voltage being generated over the time interval of said ramp control signal;
- means for comparing the amplitude of each received well logging signal with the ramp voltage and generating a pulse width modulated signal representative of the well logging signal amplitude;
- means responsive to the pulse width modulated signal for producing a digital data word which is numerically representative of the well logging signal amplitude; and
- means responsive to said mode control signal for changing the duty cycle of said digitizing apparatus including means responsive to the ramp voltage attaining a predetermined amplitude for overriding said ramp control signal and resetting said ramp generating means in readiness for another well logging signal, said ramp voltage ranging from positive to negative in the case of reception of signals of said first type and being always positive in the case of reception of signals of said second type.

7. The apparatus of claim 6 wherein a second mode control signal corresponding to another type of well tool is generated and wherein said duty cycle changing means is responsive to said second mode control signal for changing the initial starting voltage of said ramp generating means whereby the time for said ramp voltage to pass from said initial starting voltage to said predetermined amplitude will be changed to thus alter said duty cycle.

8. A method of digitizing well logging signals of first and second types derived from a well tool moved through a borehole, it being desired to digitize the signals of the two types at different repetition rates, comprising:

- receiving the well logging signals;
- selecting one of two different available predetermined voltage amplitudes, said two amplitudes being such that the time required by said ramp voltage to reach one of said two amplitudes from a selected initial starting voltage is sufficient to allow digitizing of said logging signals of said first type at the repetition rate desired therefor and the time required by said ramp voltage to reach the other of said two amplitudes from a selected initial starting voltage is sufficient to allow digitizing of said logging signals of said second type at the repetition rate desired therefor;
- generating a fixed time duration control signal in response to given incremental movements of the well tool and using said control signal to control the time duration of said ramp voltage to thereby cause the generation of a ramp voltage over a fixed time interval;
- comparing the amplitude of each received well logging signal with the ramp voltage and generating a pulse width modulated signal representative of the well logging signal amplitude;
- producing a digital data word which is numerically representative of the well logging signal amplitude in response to the pulse width modulated signal; and
- changing the repetition rate of said digitizing operation including the step of overriding said control signal and resetting said ramp voltage to said initial starting voltage in response to the ramp voltage attaining a selected one of said predetermined amplitudes.

9. The method of claim 8 wherein the step of generating a pulse width modulated signal includes the steps of comparing the ramp voltage with said well logging signal and producing a first output signal upon the ramp voltage becoming substantially equal to the signal amplitude, comparing the ramp voltage with zero volts and producing a second output signal whenever the ramp voltage has a selected polarity relative to zero volts, producing the pulse width modulated signal in response to said first and second output signals; and further including producing a binary signal representative of the polarity of each well logging signal in response to the order of occurrence of said first and second output signals.

10. The method of claim 9 wherein the step of changing the repetition rate includes the steps of overriding said control signal and resetting said ramp generating means in response to said second output signal, and disabling said digital data word producing means whenever said binary polarity signal indicates a negative well logging signal in response to said binary polarity signal.

11. The apparatus of claim 8 wherein the step of changing said repetition rate further includes the step of changing the initial starting voltage of said ramp voltage so that the time for said ramp voltage to change from said initial starting voltage to said predetermined amplitude will be different thus changing said repetition rate.

* * * * *

PO-1050
(5/69)

UNITED STATES PATENT OFFICE
CERTIFICATE OF CORRECTION

Patent No. 3,648,278 Dated March 7, 1972

Inventor(s) Gerald K. Miller

It is certified that error appears in the above-identified patent and that said Letters Patent are hereby corrected as shown below:

Col. 1, line 53, after "1970" delete the comma and substitute --)--. Col. 4, line 27, "latter" should be --later--. Col. 5, line 40, after "circuit'" insert --66--; line 41, "reached" should read --reaches--; lines 61 & 62, "resister" should read --register--. Col. 7, line 65, after "be" insert --at--. Col. 10, following line 4, insert --repetitively generating ramp voltages which have a given initial starting voltage and which change uniformly in amplitude prior to being reset to said initial starting voltage;--.

Signed and sealed this 5th day of September 1972.

(SEAL)
Attest:

EDWARD M.FLETCHER,JR.
Attesting Officer

ROBERT GOTTSCHALK
Commissioner of Patents